United States Patent [19]
van der Klugt

[11] 3,923,132
[45] Dec. 2, 1975

[54] FRICTION CLUTCH
[75] Inventor: J. P. L. van der Klugt, Veghel, Netherlands
[73] Assignee: Sperry Rand Corporation, Blue Bell, Pa.
[22] Filed: June 18, 1974
[21] Appl. No.: 480,429

[52] U.S. Cl. ............................ 192/45.1; 192/41 R
[51] Int. Cl.² ........................................ F16D 41/06
[58] Field of Search ............... 192/41 R, 41 A, 45.1; 188/82.8

[56] References Cited
UNITED STATES PATENTS

| | | | |
|---|---|---|---|
| 131,795 | 10/1872 | Stebins | 192/41 R |
| 2,347,295 | 4/1944 | Smith | 192/45.1 |
| 2,468,867 | 5/1949 | Collins | 192/45.1 X |
| 2,562,613 | 7/1951 | Halberg | 192/45.1 X |
| 2,998,874 | 9/1961 | MacNeill | 192/45.1 |
| 3,613,460 | 10/1971 | Hammond | 192/45.1 X |

*Primary Examiner*—Allan D. Herrmann
*Attorney, Agent, or Firm*—Griffin, Branigan and Butler

[57] ABSTRACT

A one way friction clutch includes an outer body having a cavity, a shaft-like inner body situated in the cavity, and a flexible strip gripping member carried by the inner body. The flexible-strip gripping member is mounted in a diametral slot of the inner body and projects beyond the outer surface of the inner body on opposite sides thereof, to contact the inner surface of the outer body. Notches are located at the surface of the inner body adjacent the areas where the flexible-strip gripping member projects beyond the surface thereof. The flexible-strip gripping member is thicker than a gap between the outer surface of the inner body and the inner surface of the outer body. When the inner body is rotated in a first direction relative to the outer body the flexible-strip gripping member wedges in the gap between the inner body and the outer body and tends to prevent relative rotation. However, when the inner body rotates in a second direction relative to the outer body the flexible-strip gripping member flexes into the notch to allow relative rotation.

4 Claims, 4 Drawing Figures

FRICTION CLUTCH

BACKGROUND OF THE INVENTION

This invention relates broadly to the art of clutches and more specifically to the art of one-way friction clutches.

Related one-way clutches are described in U.S. Pat. Nos. 143,252 to Race et al. 2,468,867 to Collins, 2,570,290 to Turner, 2,645,895 to Dubois, and 2,998,847 to MacNeill. These patents describe clutches having inner bodies surrounded by outer bodies. The inner bodies carry sprags wich project outwardly from the inner bodies but which are free to rotate toward radially disposed positions when the inner bodies turn in first directions relative to the outer bodies, and away from radially disposed positions when the inner bodies turn in second directions relative to the outer bodies. When the sprags rotate toward radially disposed positions they become locked between the inner and outer bodies to tend to prevent relative rotation between them. However, when the sprags rotate away from radially disposed positions friction between the inner and outer bodies is reduced so that relative rotation between these two members is allowed.

In some of the clutches of the above mentioned patents there are separate sprag carriers positioned between shafts and outer bodies for holding the sprags in proper positions and allowing rotation thereof. Inclusion of sprag carriers appears to add undue complexity and expense to these clutches. Thus, it is an object of this invention to provide a one-way friction clutch which does not require a separate sprag carrier mounted between a shaft and an outer body.

Similarly, the clutch structures of the above mentioned patents include numerous sprags mounted about the peripheries of the shafts with associated sprag pivoting members. These assemblies appear to be unduly complicated and expensive to manufacture. Thus, it is an object of this invention to provide a one-way friction clutch which is uncomplicated in design and relatively easy and inexpensive to assemble.

Further, the sprags of the above described patents appear to be relatively hard such that they probably cause undue wear on the inner and outer bodies or jerky operation thereof. Thus, it is an object of this invention to provide a one-way friction clutch which employs a resilient gripping member for providing decreased wear and smooth operation.

In addition, the relatively hard sprags of the prior art clutches appear to require that the inner bodies thereof be centered in the outer bodies to rather close tolerances, thereby increasing their manufacturing costs. Thus, it is an object of this invention to provide a one-way friction clutch in which an inner body is self centering during its operation.

SUMMARY OF THE INVENTION

According to principles of this invention a one-way friction clutch comprises a hollow outer body, an inner shaft (or body) mounted in the hollow outer body and a flexible-strip gripping member carried in a slot in the shaft. The flexible-strip gripping member extends across the diameter of the shaft so that it projects beyond the shaft at both its ends and contacts the inner surface of the hollow outer body on opposite sides of the shaft. A gap is formed between the shaft and the inner surface of the hollow outer body, the flexible-strip gripping member being thicker than this gap. There are notches in the surface of the shaft adjacent the flexible-strip gripping member. When the shaft is rotated in one direction relative to the outer body the tip portions of the flexible-strip gripping member become wedged, or wadded, in the gap between the shaft and the outer body. However, when the shaft is rotated in an opposite direction relative to the outer body, the tip portions of the flexible-strip gripping member bend or flex into the notch so that they merely brush along the inner surface of the outer body and do not tend to prevent relative rotation between the shaft and the outer body.

BRIEF DESCRIPTION OF THE DRAWINGS

The foregoing and other ojbects, features and advantages of the invention will be apparent from the following more particular description of preferred embodiments of the invention, as illustrated in accompanying drawings in which reference characters refer to the same parts throughout the different views. The drawings are not necessarily to scale, emphasis instead being placed upon illustrating principles of the invention in a clear manner.

Figure 1:
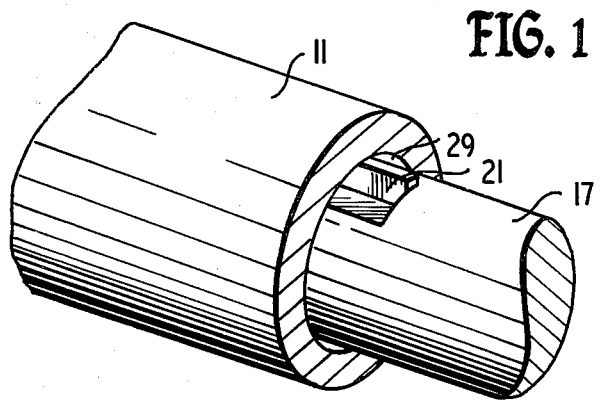
FIG. 1 is an exploded isometric view of a one-way clutch employing principles of this invention.
Figure 2:
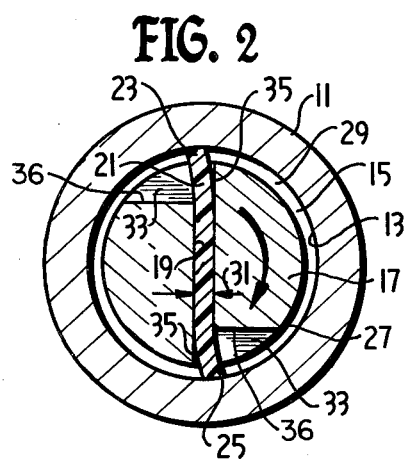
FIGS. 2 and 3 are sectional view of the one-way clutch of FIG. 1 depicting different modes of operation of the one-way clutch.
Figure 3:
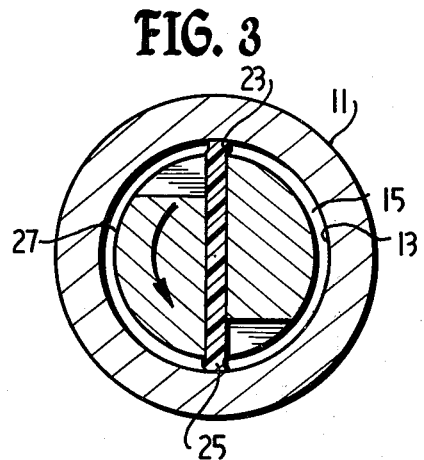

Referrring now to FIGS. 1–3, numeral 11 designates a hollow outer body defining a cylindrical inner surface 13 and a cavity 15. Positioned inside the cavity 15 is an inner body or shaft 17 which defines a radially disposed slot 19 extending across the diameter of the shaft 17. A tough resilient flexible-strip gripping member 21 is mounted in the slot 19 and tip portions thereof 23 and 25 extend beyond the outer surface 27 of the shaft 17 until they contact the inner surface 13 of the outer body 11.

The shaft 17 is somewhat smaller than the cavity 15 so that a gap 29 is formed between the shaft 17 and the inner surface 13 of the cavity 15. In this regard, however, the flexible-strip gripping member 21 has a thickness 31 which is greater than the width of the gap 29.

The shaft 17 has notches 33 formed therein adjacent to the areas at which the flexible-strip gripping member 21 extends beyond the outer surface 27 of the shaft 17.

In the preferred embodiment the shaft 17 and the outer body 11 are constructed of a relatively hard plastic material sold under the E. I. Dupont trademark DELRIN 500 and the flexible-strip gripping member 21 is constructed of a flexible plastic material sold under the trademark VULKOLLAN 199 owned by Farbenfabriken Bayer of Germany. However, other materials could be used for these members and, in particular, the magnitude of the friction torque between the shaft 17 and the outer body 11 is to some extent determined by the choice of the materials of the flexible-strip gripping member 21 and the outer body 11.

In operation, assuming the shaft 17 is the driving member and the outer body 11 is the driven member, when the shaft 17 is rotated in clockwise direction (as depicted in FIG. 2) the flexible-strip gripping-member tip portions 23 and 25 flex, or bend, into the notches 33, away from radially disposed surfaces 35 toward surfaces 36 of the slot 33. In this mode of operation, the tip portions 23 and 25 merely brush lightly on the inner surface 13 of the cavity 15 so as to cause relatively little friction between the shaft 17 and the outer body 11. Thus, very little rotational force is transmitted from the shaft 17 to the outer body 11.

However, when the shaft 17 is driven in a counter clockwise direction (FIG. 3) the portions of the flexible-strip gripping member 21 which are in the notches 33 are driven up against the radially-disposed surfaces 35, and the tip portions 23 and 25 become wedged in the gap 29 between the outer surface 27 of the shaft 17 and the inner surface 13 of the outer body 11. Thus, the tip portions 23 and 25 cause a great deal of friction between the shaft 17 and the outer body 11 and a great deal of rotational force is transmitted from the shaft 17 to the outer body 11.

It should be understood that the outer body 11 could serve as a driving member and the shaft 17 could serve as a driven member.

Figure 4:
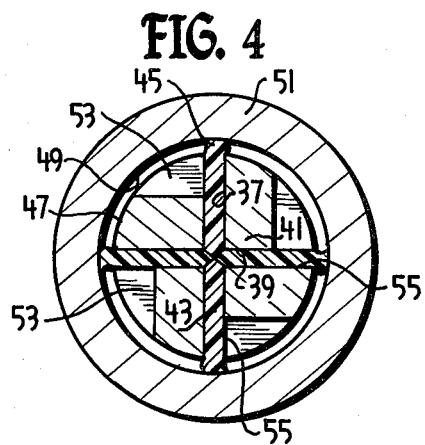
FIG. 4 is a sectional view of a second embodiment one-way clutch employing principles of this invention.

FIG. 4 depicts a second embodiment of this invention wherein there are two slots 37 and 39 in a shaft 41 in which a resilient, cross-shaped, flexible-strip gripping member 43 is disposed. Tip portions 45 of the flexible-strip gripping member 43 extend beyond the surface 47 of the shaft 41 and contact an inner surface 49 of an outer body 51. Again, there are notches 53 positioned adjacent to areas at which the flexible-strip gripping member 43 extends beyond the outer surface 47 of the shaft 41.

The embodiment of FIG. 4 functions similarly as does the embodiment of FIGS. 1-3. That is, when the shaft 41 is turned in a counter clockwise direction, as viewed in FIG. 4, the tip portions 45 become wedged between the shaft 41 and the outer body 51 to transmit rotational force from the shaft 41 to the outer body 51. However, when the shaft 41 rotates in a clockwise direction, those portions of the flexible-strip gripping member 43 in the notches 53 are free to bend or flex away from radial surfaces 55 of the notches 53 so that the tip portions 45 merely brush lightly on the inner surface 49 of the outer body 51. Thus, very little force is transmitted from the shaft 41 to the outer body 51.

It should be appreciated by those skilled in the art that one-way clutches of this invention can be relatively easily and inexpensively constructed. In addition, such clutches have smooth operations because of the resilience and flexibility of their strip gripping members. Still further, since the gripping members are resilient, they can compensate for alignment deviations of the shaft and the outer body.

While the invention has been particularly shown and described with reference to preferred embodiments, it will be understood by those skilled in the art that various changes in form and detail may be made therein without departing from the spirit and scope of the invention. For example, slot and notch configurations other than those depicted and described herein could be employed.

The embodiments of the invention in which an exclusive property or privilege are claimed are defined as follows:

1. A one-way clutch comprising:
   an outer body defining a cylindrically-shaped cavity having a cavity surface, said outer body being rotatable about an axis;
   a inner body situated in said cavity, said inner body being spaced from said cavity surface so as to form a gap therebetween, said inner body being rotatable about said axis, and said inner body having a notch in the outer surface thereof, said notch being bounded by first and second surfaces, said first surface being more nearly radially disposed then said second surface; and
   a resilient, flexible-strip gripping member being at least as thick as said gap, said flexible-strip gripping member being attached to said shaft and being disposed in said notch so as to extend through said notch beyond the outer surface of said inner body until an outer tip thereof contacts the cavity surface, said flexible-strip gripping member being located so that it is urged against said first surface in one mode of operation of said one-way clutch but it is free to flex away from said first surface during another mode of operation of said clutch;
   whereby, when said inner and outer bodies are relatively rotated in a first direction said contact of said flexible-strip gripping member with said cavity surface urges said flexible-strip gripping member against said first surface and a tip portion thereof becomes wadded in said gap between said inner and outer bodies to tend to prevent relative rotation between them, and when said inner and outer bodies are rotated in a second direction said contact of said flexible-strip gripping member with said cavity surface urges said flexible-strip gripping member away from said first surface toward said second surface, so that the tip thereof brushes lightly along said inner surface of said cavity to allow said relative rotation.

2. A one-way clutch as claimed in claim 1 wherein said inner body is a shaft which includes a diametrally disposed slot extending from said notch through said axis and wherein said flexible-strip gripping member is mounted in said slot and extends therefrom up through said notch.

3. A one-way clutch as claimed in claim 2 wherein there are notches on opposite sides of said shaft and said slot extends between said notches, with a single flexible-strip gripping member mounted in said slot and extending through said notches.

4. A one-way clutch as claimed in claim 3 wherein there are at least two pairs of oppositely disposed notches on said shaft with slots joining said notches and a single, flexible-strip gripping member mounted in said slots and notches with tips thereof projecting beyond said shaft surface to said inner surface of said outer body.

* * * * *